April 21, 1936.  A. ROSNER  2,038,200

BRAKE

Original Filed Sept. 17, 1931

INVENTOR.
ADOLPH ROSNER

Patented Apr. 21, 1936

2,038,200

UNITED STATES PATENT OFFICE 2,038,200

BRAKE

Adolph Rosner, Rockton, Ill., assignor to Bendix Aviation Corporation, South Bend, Ind., a corporation of Delaware Original application September 17, 1931, Serial No. 563,253. Divided and this application December 1, 1933, Serial No. 700,502

2 Claims. (Cl. 188—79.5)

This invention relates to brakes, and is illustrated as embodied in an internal expanding brake for an automobile.

An object of the invention is to provide a simple and inexpensive floating adjustment for the brake friction means, which can readily be operated to take up for wear. In one desirable arrangement, two parts of the friction means (as for example the two ends of parts of a friction band) are provided with means for holding coaxially aligned two nuts, one mounted on each of the parts, and which are formed to receive the right-and-left threaded floating member which serves as a connection between them, and which can be turned to adjust the friction means to take up for wear.

In the arrangement illustrated, the nuts are held by U-shaped members (shown as stampings) attached to the friction means. These members may, for example, have angular extensions welded to the adjacent ends of the friction means.

Figure 1:
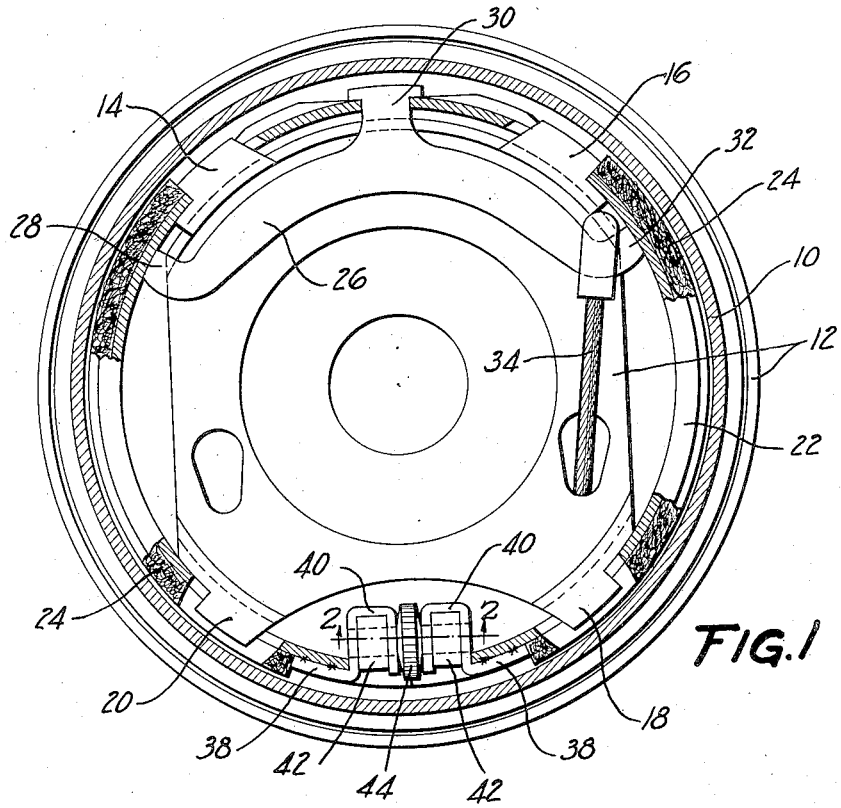
Figure 2:
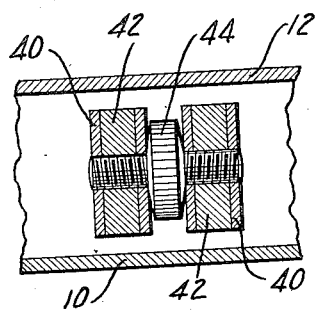

The above and other objects and features of the invention, including various novel combinations of parts and desirable particular constructions, will be apparent from the following description of the illustrative embodiment shown in the accompanying drawing, in which:

Figure 1 is a vertical section through the brake, just inside the head of the brake drum, and showing the friction means in side elevation; and Figure 2 is a partial section through the novel adjustment, on the line 2—2 of Figure 1.

The illustrated brake includes a rotatable drum 10, at the open side of which is a suitable backing plate 12. The backing plate 12 has formed thereon or attached thereto anchoring and positioning lugs 14, 16, 18, and 20, extending into slots in a friction band 22. The band 22, at least at the sides of the brake, is provided with side flanges to form channel receiving blocks 24 of friction material.

The band is distorted, to force the friction material 24 against the drum, by means such as a lever 26 formed with a lug 28 at one end in thrust engagement with the inner face of the band, and with a T-shaped central lug 30 fulcrumed in a slot in the band, and with a lug 32 at the other end to which is attached a cable or the like 34. The illustrated cable passes through the backing plate into and through a flexible Bowden conduit (not shown) outside the brake, and thence to the operating hookup on the chassis frame.

The above-described brake is more completely described, and is claimed, in my parent application No. 563,253, filed September 17, 1931, of which the present application is a division.

To the lower ends of the band 22 there are shown welded, or otherwise secured, angular extensions 38 of stamped U-shaped members 40 which hold rigidly in coaxial alignment two square nuts 42 formed to have threaded therein the right-and-left threaded ends of an adjusting member 44. Member 44 is shown with a central knurled wheel or flange by which it may be turned to adjust the brake for wear.

The ends of the band 22, while adjustably separable to compensate for wear, are not intended to be separated in applying the brake in the particular brake illustrated. Instead of spreading the ends of the band apart, the band as a whole is distorted, the upper and lower segments being sprung toward the center of the brake, thus forcing apart the left and right sides to force the friction blocks 24 against the drum. The band anchors on one or the other of the two lugs 14 or 16; the lugs 18 and 20 are merely to aid in holding the band in position.

While one illustrative embodiment has been described in detail, it is not my intention to limit the scope of the invention to that particular embodiment, or otherwise than by the terms of the appended claims.

I claim:

1. A brake friction device having parts adjustably connected by a pair of coaxial nuts, stamped U-shaped members embracing said nuts and having extensions secured to the friction device, and a connecting member between and threaded into said nuts.

2. A brake friction device having parts adjustably connected by a pair of coaxial nuts, stamped U-shaped members embracing said nuts and having extensions secured to the friction device, and threaded means adjustably threaded into said nuts.

ADOLPH ROSNER.